United States Patent
Nishiyama et al.

(10) Patent No.: US 12,500,913 B2
(45) Date of Patent: Dec. 16, 2025

(54) CLASSIFICATION DEVICE, CLASSIFICATION METHOD, AND CLASSIFICATION PROGRAM

(71) Applicant: NTT, Inc., Tokyo (JP)

(72) Inventors: Taishi Nishiyama, Musashino (JP); Kazunori Kamiya, Musashino (JP)

(73) Assignee: NTT, Inc., Tokyo (JP)

( * ) Notice: Subject to any disclaimer, the term of this patent is extended or adjusted under 35 U.S.C. 154(b) by 158 days.

(21) Appl. No.: 18/266,807

(22) PCT Filed: Dec. 16, 2020

(86) PCT No.: PCT/JP2020/047037
§ 371 (c)(1),
(2) Date: Jun. 13, 2023

(87) PCT Pub. No.: WO2022/130544
PCT Pub. Date: Jun. 23, 2022

(65) Prior Publication Data
US 2024/0048577 A1 Feb. 8, 2024

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC . H04L 63/1425; H04L 63/1408; H04L 63/14; H04L 63/1416
USPC ........................................................ 726/23
See application file for complete search history.

(56) References Cited

U.S. PATENT DOCUMENTS

| | | | | |
|---|---|---|---|---|
| 7,698,442 | B1* | 4/2010 | Krishnamurthy | G06F 21/51 709/229 |
| 8,806,622 | B2* | 8/2014 | Waterson | H04L 63/1483 726/25 |
| 8,856,937 | B1* | 10/2014 | Wuest | G06F 21/56 713/188 |
| 10,104,113 | B1* | 10/2018 | Stein | H04L 63/1425 |
| 2016/0261608 | A1* | 9/2016 | Hu | H04L 63/10 |
| 2017/0353480 | A1* | 12/2017 | Gao | G06N 99/00 |
| 2020/0151481 | A1* | 5/2020 | Yoo | G06N 3/047 |

(Continued)

OTHER PUBLICATIONS

Anderson et al., "DeepDGA: Adversarially-Tuned Domain Generation and Detection", arXiv:1610.01969v1, Proceedings of the ACM Workshop on Artificial Intelligence and Security, Oct. 6, 2016, pp. 13-21.

(Continued)

*Primary Examiner* — Kaylee J Huang
(74) *Attorney, Agent, or Firm* — XSENSUS LLP

(57) ABSTRACT

A classification device includes processing circuitry configured to determine whether or not an input URL or domain is an existing benign URL or domain, output pseudo data determined not to be an existing benign URL or domain by the annotator unit among pseudo data of benign URLs or domains generated by a generator, add the pseudo data output by the data generation unit to learning data of a malicious URL or domain, and learn a classifier for classifying the input URL or domain as being malicious or benign using the learning data of the malicious URL or domain to which the pseudo data has been added.

7 Claims, 10 Drawing Sheets

(56) References Cited

U.S. PATENT DOCUMENTS

2020/0242407 A1\* 7/2020 Gandhi ............ G06V 30/19147
2022/0182410 A1\* 6/2022 Tupsamudre ....... H04L 63/1483

OTHER PUBLICATIONS

Gould et al., "Domain Generation Algorithm Detection Utilizing Model Hardening Through GAN-Generated Adversarial Examples", Part of the Communications in Computer and Information Science book series (CCIS), vol. 1271, 2020, pp. 84-101.
Yun et al., "Khaos: An Adversarial Neural Network DGA with High Anti-Detection Ability", IEEE Transactions on Information Forensics and Security, vol. 15, 2020, pp. 2225-2240.

\* cited by examiner

CLASSIFICATION DEVICE, CLASSIFICATION METHOD, AND CLASSIFICATION PROGRAM

CROSS-REFERENCE TO RELATED APPLICATION

The present application is based on PCT filing PCT/JP2020/047037, filed Dec. 16, 2020, the entire contents of which are incorporated herein by reference.

TECHNICAL FIELD

The present invention relates to a classification device, a classification method, and a classification program for classifying URLs and domains as benign or malicious.

BACKGROUND ART

A cyber criminal operating a malicious website often changes and discards the URLs and domains of the website one after another. In this case, since it is troublesome for the criminal to create a new URL or domain, the criminal often creates a new URL or domain using a mechanical method. Further, the criminal often creates an URL or domain similar to a benign URL or domain in order to prevent a malicious URL or domain detected by security vendors and security researchers.

Therefore, there is a technology for detecting a malicious URL or domain using a GAN. The generative adversarial network (GAN) is a technology for creating pseudo data which is difficult to distinguish whether it is real or not by machine learning.

For example, it is possible to generate an URL or a domain similar to a benign URL or domain by using the GAN. Then, an URL or a domain (pseudo data) similar to a benign URL or domain is generated by the GAN, and the pseudo data is added to malicious data in machine learning data of a classifier to perform machine learning. Accordingly, a technology for generating a classifier for accurately classifying benign or malicious has been proposed for a malicious URL or domain similar to a benign URL or domain (refer to Non Patent Literature 1 and 2).

CITATION LIST

Non Patent Literature

[NPL 1] N. Gould et al., "Domain Generation Algorithm Detection Utilizing Model Hardening Through GAN-Generated Adversarial Examples." The first International Workshop on Deployable Machine Learning for Security Defense (2020)

[NPL 2] H. Anderson et al., "DeepDGA: Adversarially-Tuned Domain Generation and Detection." Proceedings of the 2016 ACM Workshop on Artificial Intelligence and Security. pp. 13-21, ACM (2016)

SUMMARY OF INVENTION

Technical Problem

However, in the above-described technology, pseudo data generated using the GAN may be an existing benign URL/domain itself. When such pseudo data is used as malicious machine learning data for a classifier, the classification performance of the classifier is deteriorated. Even if a large amount of pseudo data is used for learning data of a classifier, a time required for learning of the classifier increases and the classification performance of the classifier may not be very high.

Therefore, an object of the present invention is to solve the aforementioned problem and to provide a classifier for classifying benign and malicious URLs or domains with high classification performance.

Solution to Problem

To solve the above problem, the classification device includes: processing circuitry configured to: determine whether or not an input URL or domain is an existing benign URL or domain; output pseudo data determined not to be an existing benign URL or domain among pseudo data of benign URLs or domains generated by a generator; add the pseudo data output to learning data of a malicious URL or domain; and learn a classifier for classifying the input URL or domain as being malicious or benign using the learning data of the malicious URL or domain to which the pseudo data has been added.

Advantageous Effects of Invention

According to the present invention, it is possible to provide a classifier for classifying benign and malicious URLs and domains with high classification performance.

DESCRIPTION OF EMBODIMENTS

Figure 1:
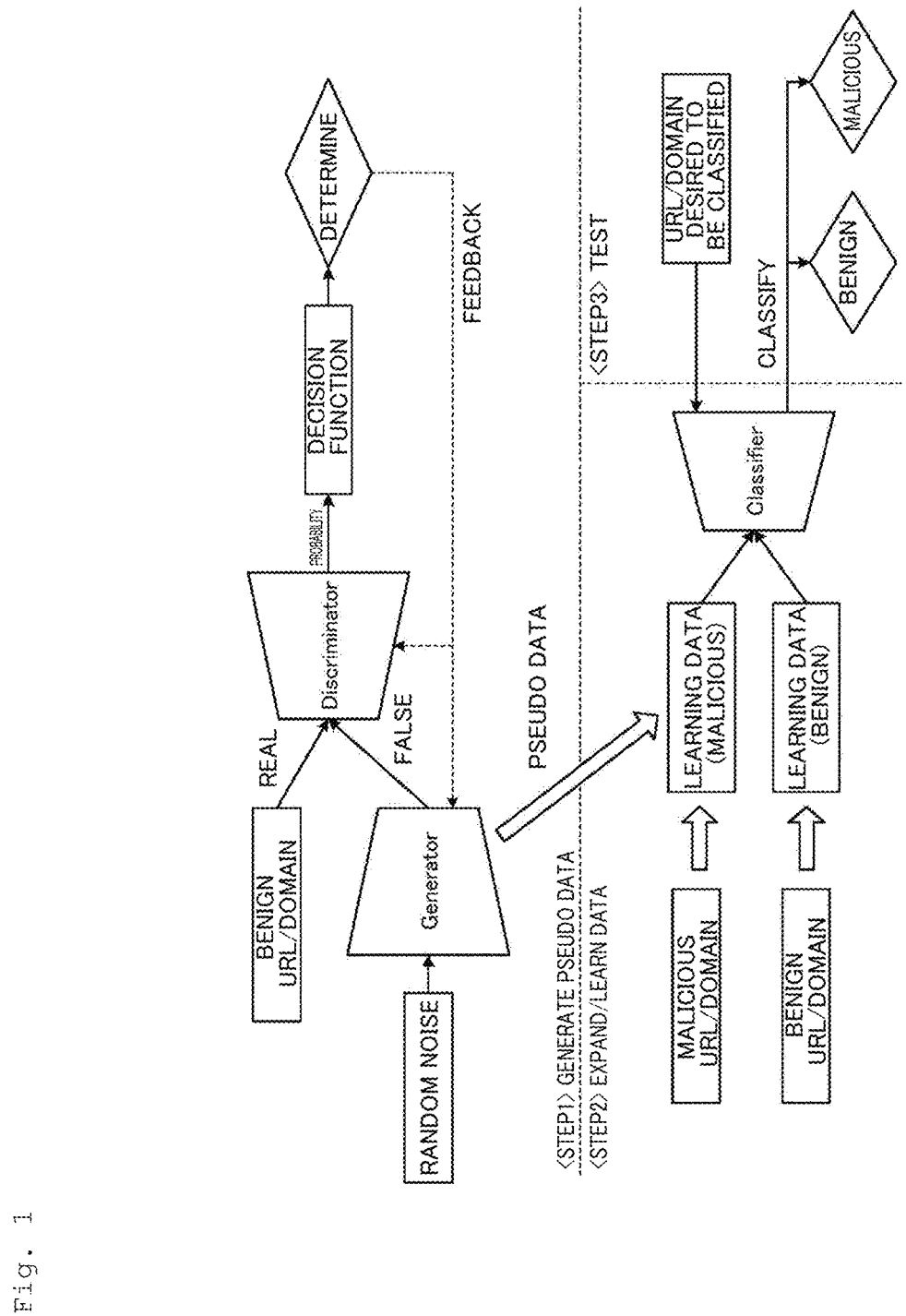
FIG. 1 is a diagram illustrating expansion of learning data using a GAN.

Hereinafter, forms (embodiments) for carrying out the present invention will be described as a first embodiment to a third embodiment with reference to the drawings. The present invention is not limited to respective embodiments.

Expansion of Learning Data Using GAN

First, expansion of learning data using a GAN, which is a basic technology of a classification device of each embodiment, will be described using FIG. 1. The GAN is a method of deep learning to cause models (generator and discriminator) of two neural networks to compete and learn.

The generator receives low-dimensional random noise as an input and generates pseudo data similar to actual data. The discriminator (identifier) identifies whether or not input data was generated by the generator by comparing the input data with real data. Then, the discriminator outputs a probability that the input data was generated by the generator.

The GAN is a method trained by the two neural networks together. The GAN determines whether or not data input to the discriminator was generated by the generator by applying a decision function to the probability output from the discriminator. Then, when a feedback indicating whether the decision is correct or not is received, the discriminator adjusts parameters on the basis of the feedback. The discriminator provides the feedback to the generator. The generator adjusts parameters on the basis of the feedback.

In this way, the generator performs learning to generate pseudo data which cannot be discovered by the discriminator. Further, the discriminator performs learning to discover the pseudo data generated by the generator. By repeating this operation, the generator can finally generate pseudo data which cannot be distinguished from real data.

In general, in supervised learning, the larger the amount of learning data, the higher the classification performance of a classifier. Therefore, there is a method for improving the classification performance of a classifier by adding an URL or a domain mechanically automatically generated using the aforementioned GAN to learning data.

This method includes three phases of STEP1, STEP2, and STEP3. STEP1 is a phase in which pseudo data of a benign URL/domain is generated using the GAN. Each of the generator and the discriminator of the GAN includes a neural network. The neural networks of the generator and the discriminator may have different shapes. In STEP1, the generator receives random noise as input according to by a GAN mechanism and generates pseudo data of a benign URL/domain.

STEP2 is a phase in which malicious learning data is expanded with the pseudo data generated in STEP1 and the classifier is trained. In normal supervised learning, a classifier is trained using benign learning data (benign URL/domain data) and malicious learning data (malicious URL/domain data). In the method shown in FIG. 1, pseudo data of a benign URL/domain generated by the generator is treated as malicious data, and malicious learning data is expanded.

Accordingly, it is possible to generate a classifier for classifying benign or malicious with higher performance as compared to a case of normal supervised learning. For example, a classifier can also be trained to classify benign or malicious for a malicious URL/domain similar to a benign URL/domain with high classification performance.

STEP3 is a phase in which the input URL/domain is tested using the classifier trained in STEP2. For example, an URL/domain desired to be classified as being benign or malicious is input to the classifier trained in STEP2. Then, a result of classification as to whether the URL/domain is benign or malicious is received from the classifier.

First Embodiment

Overview

Figure 2:
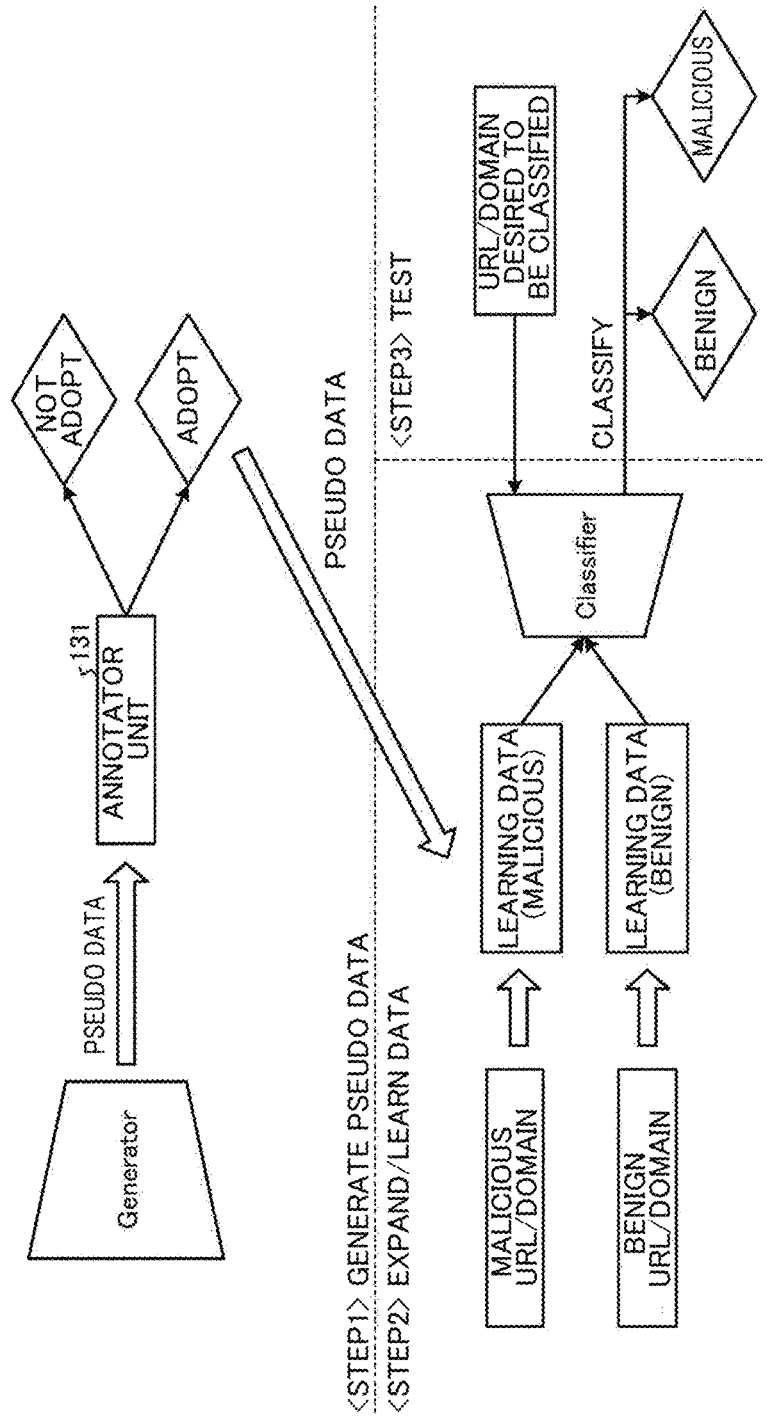
FIG. 2 is a diagram illustrating an overview of a classification device of a first embodiment.

First, an overview of a classification device of a first embodiment will be described using FIG. 2. The classification device of the first embodiment selects pseudo data to be used to expand malicious learning data from among pseudo data generated by generator using an annotator unit 131 shown in FIG. 2. The generator shown in FIG. 2 is a generator trained such that it generates pseudo data of a benign URL/domain by the aforementioned GAN mechanism.

The classification device determines whether or not pseudo data of a benign URL/domain generated by the generator is an existing benign URL/domain by the annotator unit 131 in STEP1.

The annotator unit 131 determines whether the input URL/domain is an existing benign URL/domain and applies a label thereto. For example, the annotator unit 131 uses a management service with a domain name such as "Who is" or operates a search engine in a sandbox to determine whether or not the input pseudo data is an existing benign URL/domain.

Then, when the annotator unit 131 determines that the pseudo data is an existing benign URL/domain, the classification device determines that the pseudo data will not be adopted for expansion of malicious learning data. On the other hand, when the annotator unit 131 determines that the pseudo data is not an existing benign URL/domain, the classification device determines that the pseudo data will be adopted for expansion of malicious learning data.

Then, the classification device adds the pseudo data determined to be adopted for expansion of the malicious learning data in STEP1 to the malicious learning data. Accordingly, the malicious learning data is expanded. Then, the classification device performs learning of a classifier using the expanded malicious learning data and benign learning data (STEP2). STEP3 thereafter is the same as STEP3 described using FIG. 1 and thus description thereof is omitted.

Example of Configuration

Figure 3:
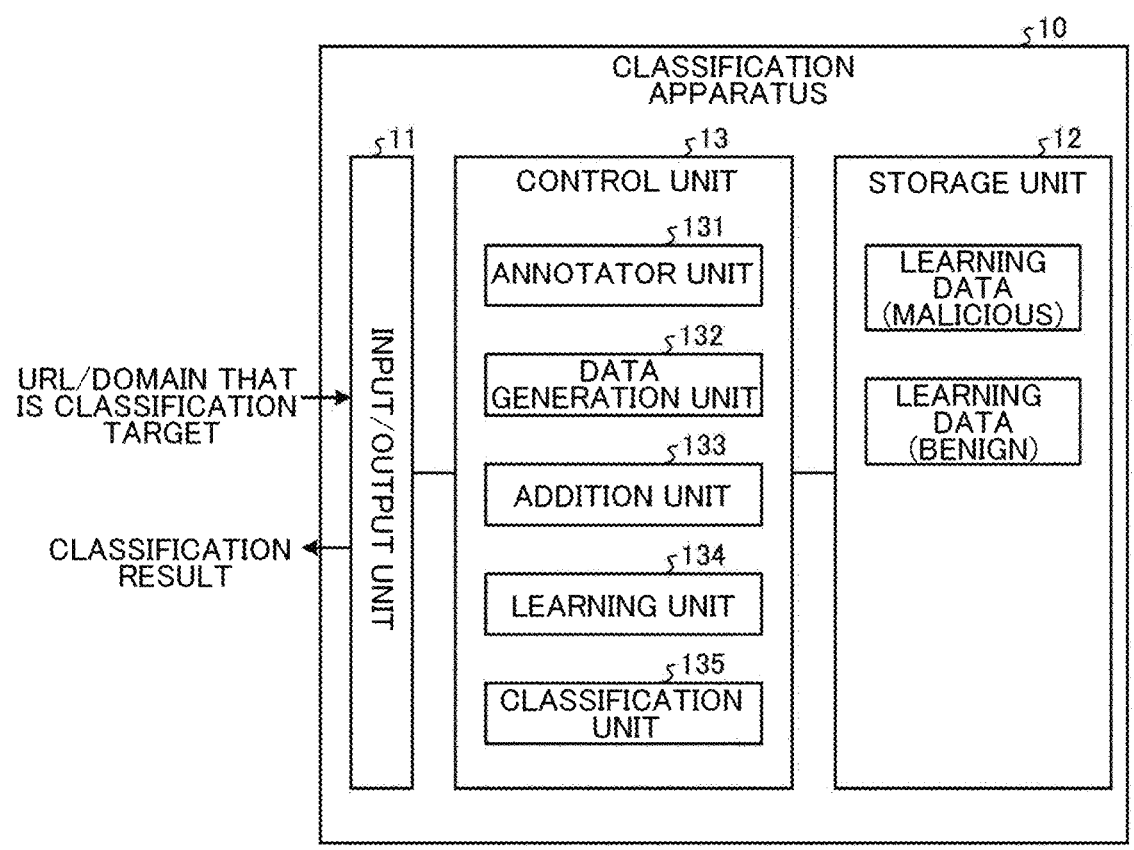
FIG. 3 is a diagram showing an example of a configuration of the classification device of the first embodiment.

An example of a configuration of the classification device 10 of the first embodiment will be described with reference to FIG. 3. The classification device 10 includes, for example, an input/output unit 11, a storage unit 12, and a control unit 13.

The input/output unit 11 controls input/output of various types of data. For example, the input/output unit 11 receives input of an URL/domain of a classification target of the classification device 10 and outputs a classification result of whether the URL/domain of the classification target is benign or malicious.

The storage unit 12 stores data referred to by the control unit 13 when executing various types of processing. The storage unit 12 stores, for example, malicious learning data and benign learning data used for learning of the classifier. The malicious learning data is, for example, a set of malicious URLs/domains. The benign learning data is, for example, a set of benign URLs/domains.

Further, the storage unit 12 stores parameter information (not shown) used by the classifier. The parameter information is updated by learning of the classifier by a learning unit 134 (which will be described later).

The control unit 13 controls the entire classification device 10. The control unit 13 includes, for example, the annotator unit 131, a data generation unit 132, an addition unit 133, the learning unit 134, and a classification unit 135.

The annotator unit 131 determines whether or not an input URL/domain is an existing benign URL/domain. The annotator unit 131 determines whether or not pseudo data of a benign URL/domain generated by the data generation unit 132 is an existing benign URL/domain using, for example, commercial anti-virus software "Who is" or the like.

"Who is" is a service for providing registration information of Internet resources managed by an Internet registry, and since a person, an enterprise name, a registration date and the like registered therein are known, it is also possible to determine whether or not a domain is an existing domain.

Further, the annotator unit 131 may determine whether or not a given URL/domain is an existing benign URL/domain using other information.

For example, there is a service for, when an URL/domain is input, checking the URL/domain with a commercial antivirus product to learn whether or not the URL/domain has been detected as being malicious and for searching for whether or not there are cases in which other past users have reported that the URL/domain is malicious. Then, an annotator unit 131 may determine whether or not a given URL/domain is an existing benign URL/domain by checking whether or not the URL/domain has been detected as being malicious by a commercial antivirus software using the aforementioned service. Further, the annotator unit 131 may determine whether or not the URL/domain is an existing benign URL/domain by searching for whether or not there are cases in which users have reported that the given URL/domain is malicious using the aforementioned service.

The data generation unit 132 generates and outputs data to be added to malicious learning data. For example, the data generation unit 132 generates pseudo data of a benign URL/domain by a generator of a GAN. Then, the data generation unit 132 requests that the annotator unit 131 determine whether or not the generated pseudo data is an existing benign domain and outputs the pseudo data determined not to be an existing benign domain by the annotator unit 131 to the addition unit 133.

The addition unit 133 adds the pseudo data output by the data generation unit 132 to the malicious learning data.

The learning unit 134 learns a classifier for classifying whether the URL/domain is benign or malicious using the learning data of a malicious domain to which the pseudo data has been added by the addition unit 133 and learning data of a benign domain.

The classification unit 135 classifies the URL/domain as being benign or malicious using the classifier trained by the learning unit 134. Then, the classification unit 135 outputs a result of classification of the URL/domain as being benign or malicious.

Example of Processing Procedure

Figure 4:
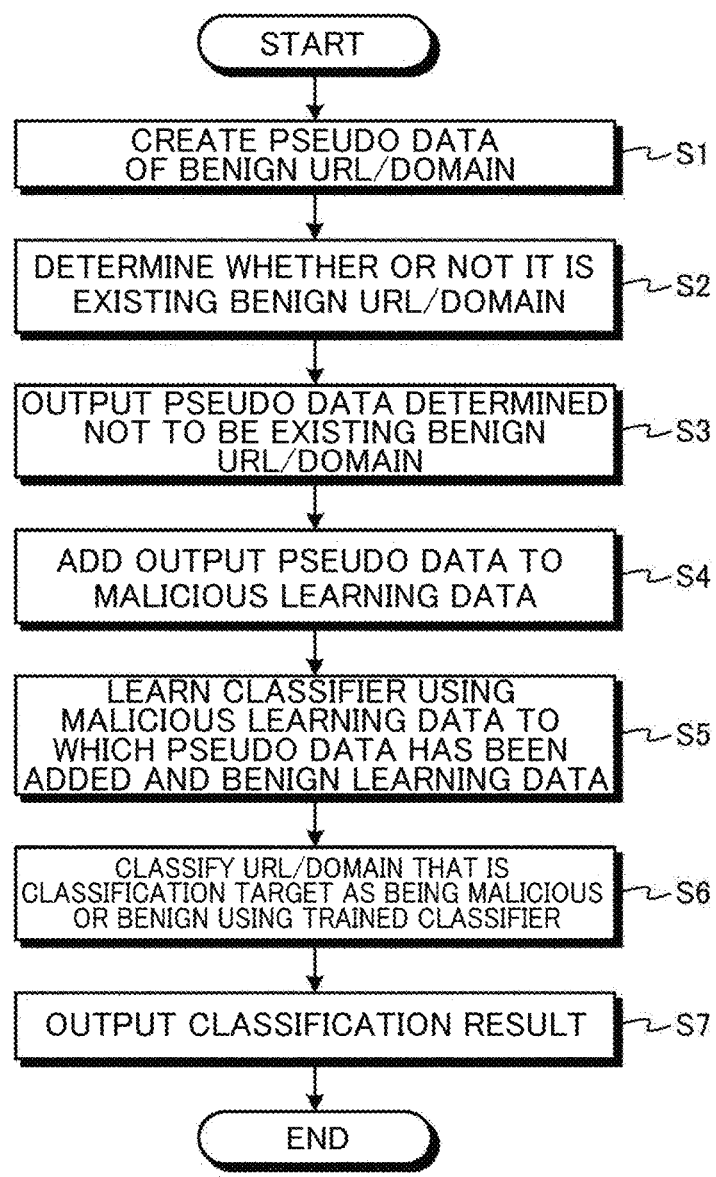
FIG. 4 is a flowchart showing an example of a processing procedure of the classification device of the first embodiment.

Next, an example of a processing procedure of the classification device 10 will be described with reference to FIG. 4. First, the data generation unit 132 generates pseudo data of a benign URL/domain by the generator (S1). Then, the annotator unit 131 determines whether or not the pseudo data generated in S1 is an existing benign URL/domain (S2).

After S2, the data generation unit 132 outputs the pseudo data determined not to be an existing URL/domain by the annotator unit 131 to the addition unit 133 (S3). Then, the addition unit 133 adds the output pseudo data to malicious learning data (S4).

After S4, the learning unit 134 learns the classifier using the malicious learning data to which the pseudo data has been added and benign learning data (S5). Then, the classification unit 135 classifies the URL/domain that is a classification target as being benign or malicious using the trained classifier (S6). Thereafter, the classification unit 135 outputs the classification result (S7).

In this manner, the classification device 10 can generate the classifier for classifying an URL/domain as being benign or malicious with high classification performance. As a result, the classification device 10 can classify an URL/domain that is a classification target as being benign or malicious with high classification performance.

Second Embodiment

Overview

Figure 5:
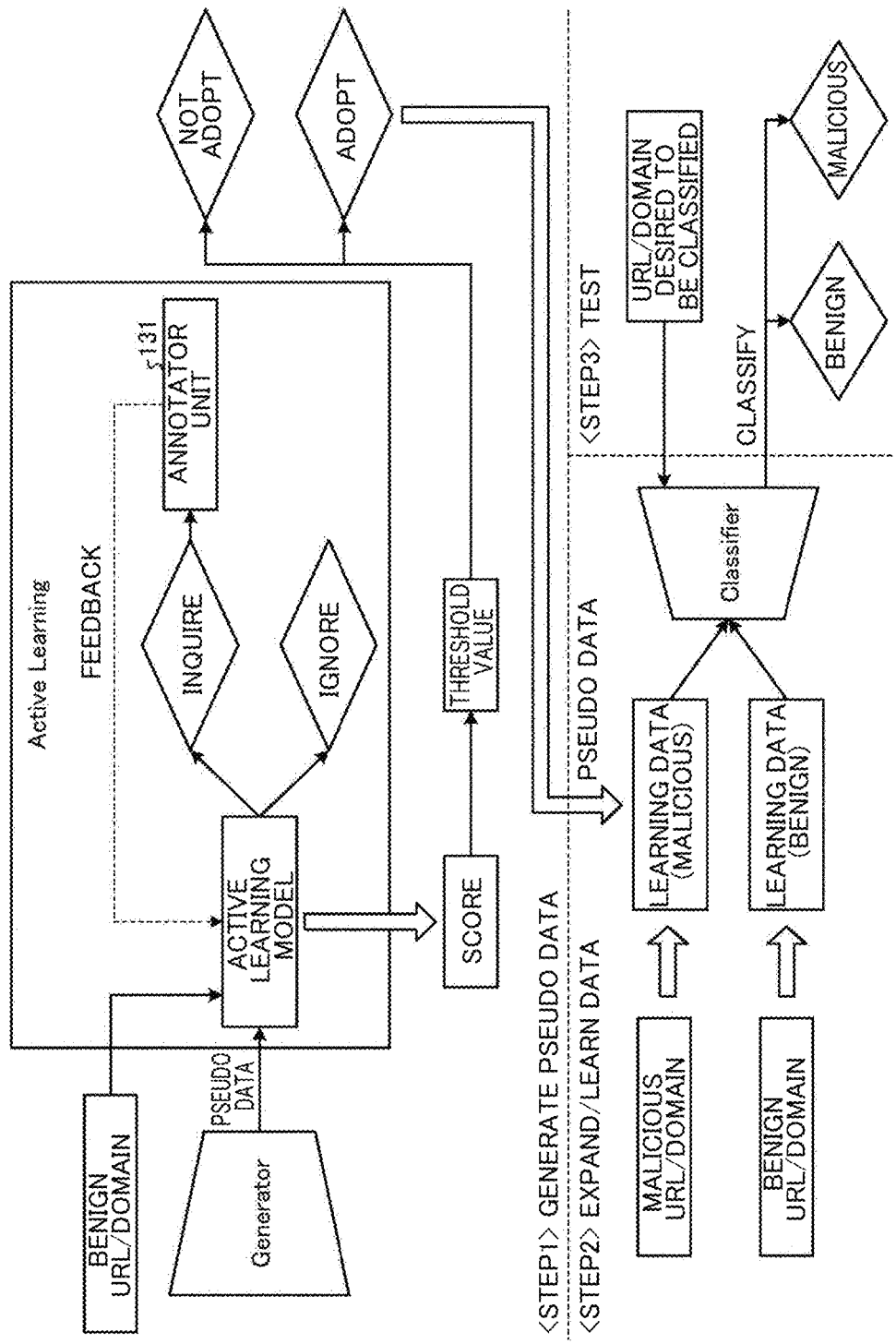
FIG. 5 is a diagram illustrating an overview of a classification device of a second embodiment.

An overview of a classification device 10a of a second embodiment will be described using FIG. 5. The same constituent elements as those in the first embodiment are denoted by the same reference numerals and a description thereof has been omitted. In the following description, a generator is assumed to be a generator for generating pseudo data of a benign URL/domain by a GAN as in the first embodiment.

Since a large amount of pseudo data is generated by the generator in general, a manager of the classification device 10a needs to cause the annotator unit 131 to execute processing while considering the resources of the annotator unit 131. For example, when the annotator unit 131 determines whether pseudo data is an existing benign URL/domain using external information, there are problems such as an upper limit of search in an application programming interface (API) and conditions of service use charge, or when the annotator unit 131 is manually realized, there are human resource (operation of manpower) problems, and thus the manager needs to consider such resources.

Accordingly, the classification device 10a learns a model (active learning model) for determining whether pseudo data generated by the generator is an existing benign URL/domain by active learning using a determination result of the annotator unit 131.

Then, the classification device 10a determines whether the pseudo data generated by the generator is an existing benign URL/domain by the trained active learning model. Then, the classification device 10a adopts the pseudo data determined not to be an existing benign URL/domain by the active learning model as pseudo data used to expand malicious learning data.

For example, the active learning model calculates a score of pseudo data generated by the generator by setting a score of an existing benign URL/domain to 0 and setting a score of a benign URL/domain (pseudo data) that does not exist to 1. Then, the classification device 10a adopts pseudo data having a score calculated by the active learning model and equal to or greater than a predetermined threshold value as pseudo data to be added to the malicious learning data.

In this manner, the classification device 10a can appropriately select pseudo data to be added to the malicious learning data even when resources of the annotator unit 131 are limited.

Active Learning

Here, active learning will be described. Active learning is machine learning for efficiently generating a data set at a limited cost and realizing highly accurate classification. This is often used when there is little labeled data although data is enormous or when not only machine learning but also human knowledge is required. If it is known to which data is labeled to generate a more accurate classifier, the labeling cost can be considerably reduced.

There are two types of active learning, namely, pool-based sampling and stream-based selective sampling. Pool-based sampling is a method of selecting data to be labeled preferentially, which is useful for learning, from unlabeled data and causing an annotator label the data. Stream-based selective sampling is a method of selecting whether to label input streaming data.

Example of Configuration

Figure 6:
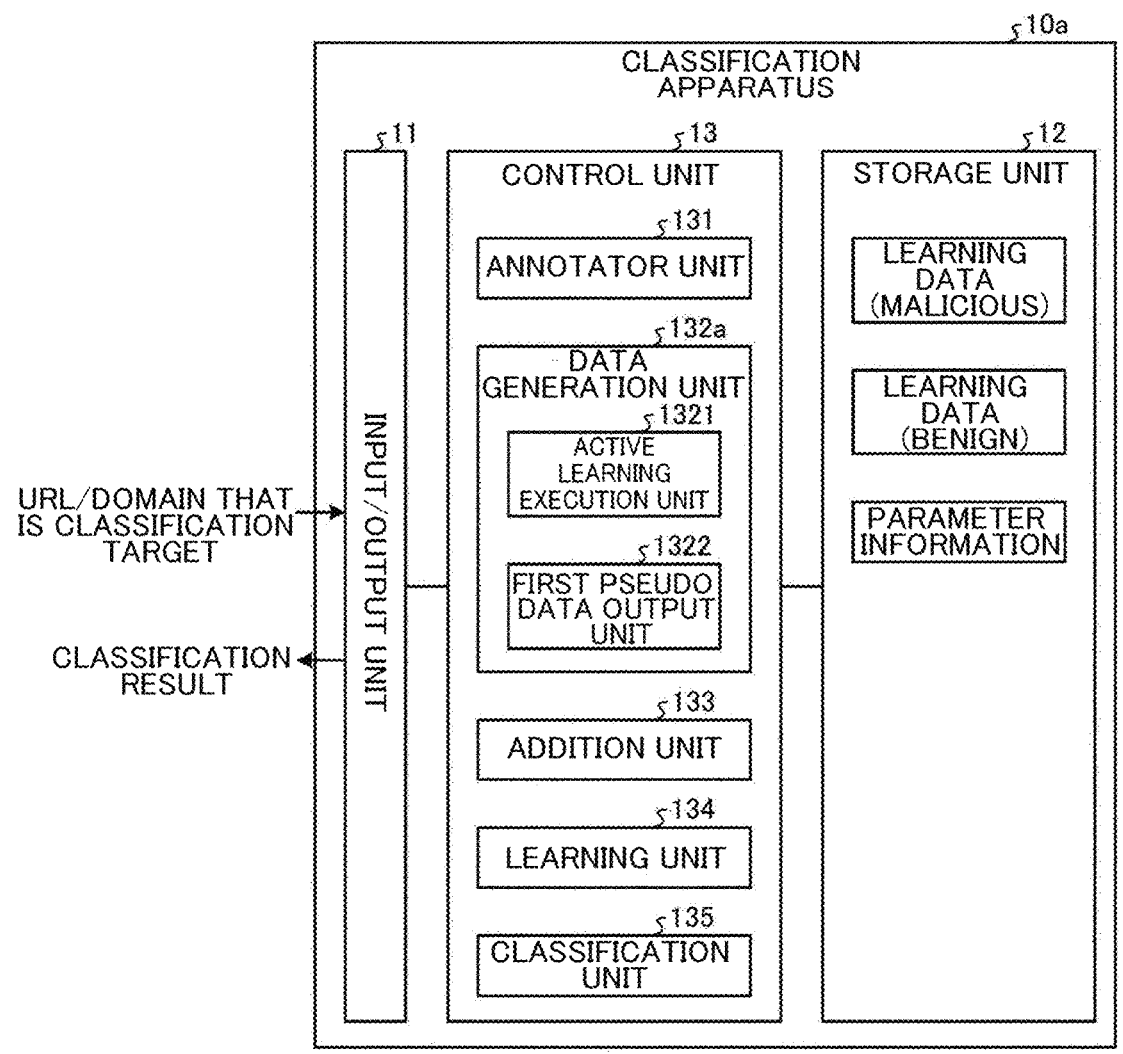
FIG. 6 is a diagram showing an example of a configuration of the classification device of the second embodiment.

An example of the configuration of the classification device 10a will be described with reference to FIG. 6. The classification device 10a includes a data generation unit 132a. The data generation unit 132a includes an active learning execution unit 1321 and a first pseudo data output unit 1322. In addition, the storage unit 12 stores parameter information of a model trained by the active learning execution unit 1321.

The active learning execution unit 1321 learns a model (active learning model) for determining whether an input URL/domain is an existing benign URL/domain or pseudo data by active learning using a determination result of the annotator unit 131 as a feedback. Details of the learning procedure of the active learning model by the active learning execution unit 1321 will be described later.

The first pseudo data output unit 1322 determines whether or not pseudo data generated by the generator is an existing benign URL/domain by the active learning model. Then, the first pseudo data output unit 1322 outputs the pseudo data determined not to be an existing benign URL/domain by the active learning model to the addition unit 133.

For example, the first pseudo data output unit 1322 determines whether or not the pseudo data generated by the generator is an existing benign URL/domain by the active learning model and outputs a score indicating the determination result.

For example, it is assumed that the score has a value of 0 to 1, and is closer to 0 as the pseudo data is similar to "existing benign URL/domain" and closer to 1 as the pseudo data is similar to "data (pseudo data) that is not an existing benign URL/domain." In this case, the first pseudo data output unit 1322 outputs pseudo data having a score equal to or greater than a predetermined threshold value (for example, 0.5) (that is, data highly likely not to be an existing benign URL/domain) to the addition unit 133.

According to this classification device 10a, it is possible to reduce the likelihood of an existing benign URL/domain being used to expand malicious learning data of the classifier even when the resources of the annotator unit 131 are limited. As a result, the classification device 10a can generate a classifier with high classification performance.

Operation Example

An operation example of the classification device 10a will be described using FIG. 5 with reference to FIG. 6.

(1) First, in generation of pseudo data of STEP1, the classification device 10a performs active learning. That is, the active learning execution unit 1321 of the classification device 10a (refer to FIG. 6) inquires of the annotator unit 131 about some pseudo data generated by the generator. The annotator unit 131 determines whether or not the pseudo data is an existing benign URL/domain by inputting the pseudo data to a search engine through a service such as "Who is" or a sandbox.

Then, when the annotator unit 131 determines that the pseudo data is an existing benign URL/domain, the active learning execution unit 1321 excludes the pseudo data from the pseudo data generated by the generator. Accordingly, the active learning execution unit 1321 obtains pseudo data that has passed the determination of the annotator unit 131. Although the number of pieces of pseudo data to be inquired to the annotator unit 131 by the active learning execution unit 1321 may be an arbitrary number, a larger number of pieces of pseudo data can realize learning of a model with higher performance.

(2) Next, the active learning execution unit 1321 performs active learning of a model for determining whether input data is "pseudo data" or an "existing benign URL/domain" using the pseudo data that has passed the determination of the annotator unit 131 and a benign URL/domain. By this active learning, the model can select pseudo data which is useful for learning and is to be labeled preferentially from among pseudo data newly generated by the generator. Here, active learning is pool-based sampling type active learning.

(3) Next, the active learning execution unit 1321 inquires of the annotator unit 131 about the pseudo data selected as pseudo data to be labeled preferentially by the model in (2). The annotator unit 131 determines whether or not the pseudo data is an existing benign URL/domain. Then, the active learning execution unit 1321 feeds back the result of determination by the annotator unit 131 to the model (active learning model).

That is, when the selected pseudo data is determined to be an existing benign URL/domain by the annotator unit 131 in (3), the active learning execution unit 1321 adds the pseudo data to the "benign URL/domain" in (2). On the other hand, when the selected pseudo data is determined not to be an existing benign URL/domain by the annotator unit 131 in (3), the active learning execution unit 1321 adds the pseudo data to "pseudo data that has passed the determination of the annotator unit 131" in (2).

(4) The Active learning execution unit 1321 learns a pool-based sampling type active learning model on the basis of the feedback in (3).

(5) The active learning execution unit 1321 repeatedly executes processing of (3) and (4) as long as the resources of the classification device 10a are permitted, or executes the processing until pseudo data to be inquired to the annotator unit 131 in (3) is similar each time.

(6) After (5), the active learning model can determine whether the input URL/domain is "pseudo data" or an "existing benign URL/domain" with high classification performance. Thereafter, the first pseudo data output unit 1322 determines whether pseudo data generated by the generator is "pseudo data" or an "existing benign URL/domain" using the active learning model and outputs a score indicating the determination result.

For example, the label of "pseudo data" is set to 1 and the label of an existing benign URL/domain is set to 0. The score takes a value from 0 to 1. Therefore, it can be determined that the pseudo data is closer to "pseudo data" as the score output from the active learning model is closer to 1 and the pseudo data is closer to an "existing benign URL/domain" as the score is closer to 0.

(7) The first pseudo data output unit 1322 selects pseudo data to be used to expand malicious learning data in STEP2 on the basis of the score. For example, the first pseudo data output unit 1322 selects pseudo data having a score output by the active learning model and equal to or greater than a predetermined threshold value (for example, 0.5) as pseudo data used to expand malicious learning data in STEP2. On the other hand, the first pseudo data output unit 1322 does not select pseudo data having a score less than the predetermined threshold value as pseudo data used to expand the malicious learning data in STEP2. Then, the first pseudo data output unit 1322 outputs the selected pseudo data to the addition unit 133.

When it is desired to reduce the likelihood of the classification device 10a causing the classifier to learn an existing benign URL/domain as a malicious URL/domain in STEP2, the manager may set the score threshold value to be high. For example, the score threshold value may be set to 0.9 or the like instead of 0.5. However, if the score threshold value is excessively high, there is a trade-off that the number of pieces of pseudo data used to expand the malicious learning data in STEP2 is reduced. Therefore, this score threshold value is a hyper parameter and needs to be adjusted at the time of learning the classifier in STEP2.

STEP 2 and STEP3 thereafter are the same processing of the first embodiment and thus description thereof is omitted.

According to this classification device 10a, it is possible to reduce the likelihood of an existing benign URL/domain being used to expand malicious learning data of the classifier even when the resources of the annotator unit 131 are limited. As a result, the classification device 10a can generate a classifier with high classification performance.

Modified Example of Second Embodiment

Figure 7:
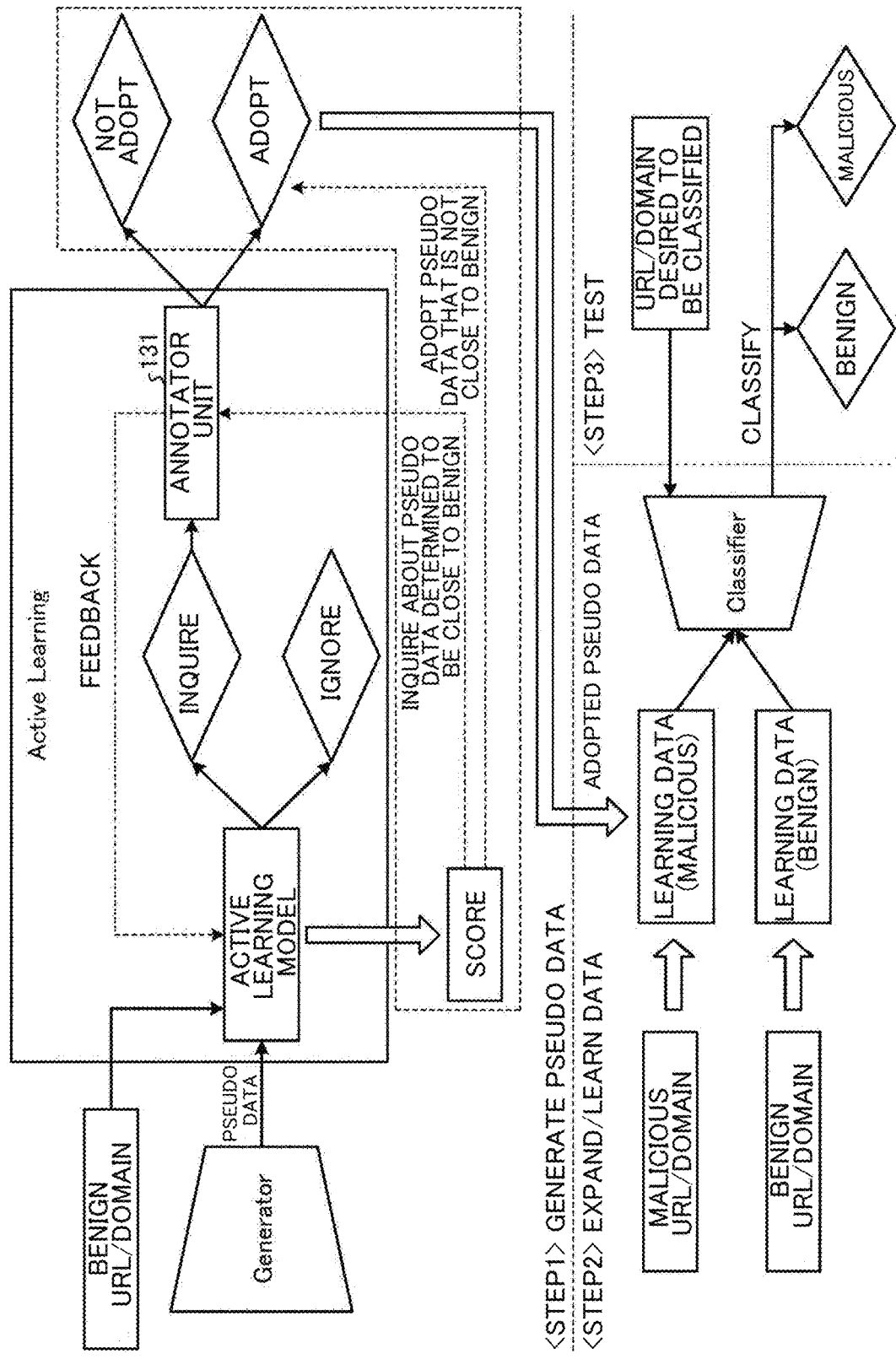
FIG. 7 is a diagram illustrating a modified example of the classification device of the second embodiment.

When there is a margin in the resources of the annotator unit 131, the classification device 10a may inquire of the annotator unit 131 about pseudo data determined to be close to be benign on the basis of a score output by the active learning model and determine whether or not to adopt the pseudo data on the basis of the inquiry result, as shown in FIG. 7.

For example, the first pseudo data output unit 1322 (refer to FIG. 6) of the classification device 10a requests that the annotator unit 131 determine whether or not higher X (X can be changed in response to the resources of the annotator unit 131) pieces of pseudo data having scores output by the active learning model and close to an "existing benign URL/domain" are existing benign URLs/domains.

Then, when the annotator unit 131 determines that the pseudo data is an existing benign URL/domain, the first pseudo data output unit 1322 determines that the pseudo data will not be adopted. On the other hand, when the annotator unit 131 determines that the pseudo data is not an existing benign URL/domain, the first pseudo data output unit 1322 determines that the pseudo data will be adopted.

On the other hand, the classification device 10a determines that pseudo data determined not to be close to be benign will be adopted on the basis of the score output by the active learning model. For example, the first pseudo data output unit 1322 of the classification device 10a determines that all pseudo data lower than the higher X pieces of pseudo data having scores output by the active learning model and close to an "existing benign URL/domain" or some thereof determined using a predetermined threshold value will be adopted.

Then, the first pseudo data output unit 1322 outputs the pseudo data determined to be adopted by the above-described processing to the addition unit 133. Thereafter, the addition unit 133 adds the pseudo data to malicious learning data. Thereafter, the classification device 10a executes STEP2 and STEP3 in the same manner as in the first embodiment.

According to this classification device 10a, it is possible to further reduce the likelihood of an existing benign URL/domain being used to expand malicious learning data of the classifier. As a result, the classification device 10a can generate a classifier having higher classification performance.

Third Embodiment

Next, a classification device 10b of a third embodiment will be described using FIG. 8. The same components as those in the first embodiment and the second embodiments are denoted by the same reference numerals and description thereof is omitted. The classification device 10b is characterized in that determination of the annotator unit 131 is combined with expansion of learning data using the GAN described in FIG. 1.

Figure 8:
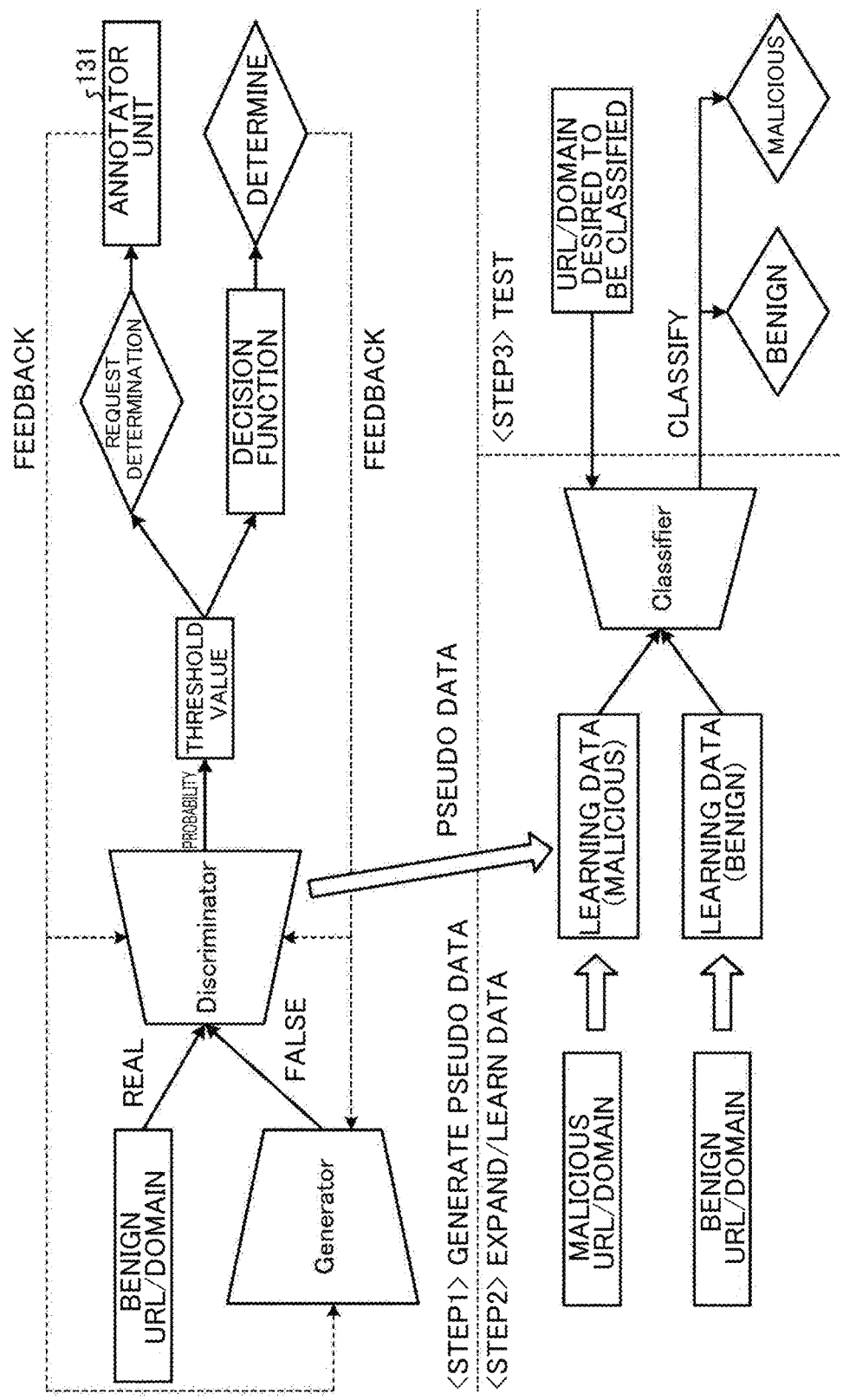
FIG. 8 is a diagram illustrating an overview of a classification device of a third embodiment.

Since the generator, discriminator, decision function, and feedback to the generator and the discriminator using a determination result by the decision function shown in FIG. 8 are the same as those in FIG. 1, description thereof is omitted.

In STEP1, the classification device 10b requests that the annotator unit 131 determine data that is difficult to be determined to be a "benign URL/domain" or "pseudo data" according to a probability output by the discriminator.

For example, the value of the probability output by the discriminator is closer to 1 as the likelihood of data being "pseudo data" is higher and closer to 0 as the likelihood of the data being "pseudo data" is lower (the likelihood of the data being a benign URL/domain is higher). Therefore, when the value of the probability outputted by the discriminator is about 0.5, for example, the data can be considered as data that is difficult to determine to be a "benign URL/domain" or "pseudo data."

Then, the classification device 10b requests that the annotator unit 131 determine data determined to be data that is difficult to determine to be a "benign URL/domain" or "pseudo data" according to the probability output by the discriminator.

For example, the classification device 10b assumes data having a probability value of a predetermined threshold value (for example, between 0.4 to 0.6) as data that is difficult to determine to be a "benign URL/domain" or "pseudo data" and requests that the annotator unit 131 determines the data. The annotator unit 131 determines whether or not the data is an existing benign URL/domain.

Then, the classification device 10b receives a result of determination of whether or not the data is an existing benign URL/domain from the annotator unit 131 and feeds back the determination result to the generator and the discriminator.

With respect to pseudo data that is not difficult to determine to be a "benign URL/domain" or "pseudo data" on the basis of the probability output by the discriminator, the classification device 10b performs feedback to the generator and the discriminator using a determination result according to a decision function as described in FIG. 1. The discriminator and the generator adjust parameters by such feedback.

Since processing of STEP2 and STEP3 is the same as those of the first and second embodiments, description thereof is omitted.

Example of Configuration

Figure 9:
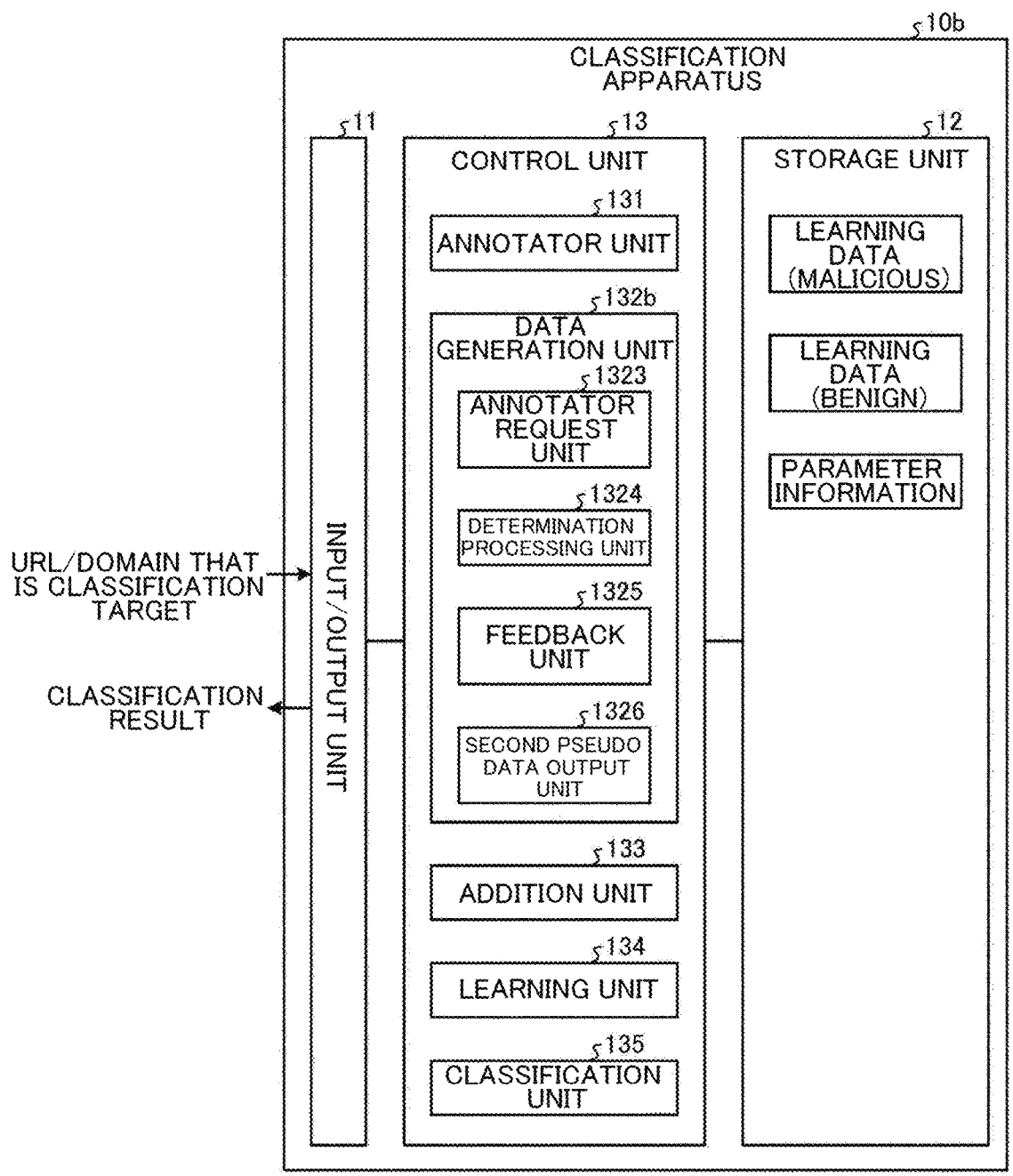
FIG. 9 is a diagram showing an example of a configuration of the classification device of the third embodiment.

An example of the configuration of the classification device 10b will be described with reference to FIG. 9. The classification device 10b includes a data generation unit 132b. The data generation unit 132b includes an annotator request unit 1323, a determination processing unit 1324, a feedback unit 1325, and a second pseudo data output unit 1326. The storage unit 12 stores parameter information of the generator and the discriminator.

The annotator request unit 1323 requests that the annotator unit 131 determine data in which input data is difficult to determine to be a "benign URL/domain" or "pseudo data" according to a probability output by the discriminator.

For example, the annotator request unit 1323 requests that the annotator unit 131 determine data having a probability of a predetermined threshold value (for example, between 0.4 to 0.6) Then, when a result of determination of whether or not corresponding pseudo data is an existing benign URL/domain is received from the annotator unit 131, the annotator request unit 1323 outputs the determination result to the feedback unit 1325. In addition, with respect to data having a probability other than the predetermined threshold value (for example, between 0.4 to 0.6), the annotator request unit 1323 outputs the probability to the determination processing unit 1324.

The determination processing unit 1324 applies the probability output from the discriminator to the decision function to determine whether the input data is "pseudo data" or a "benign URL/domain." Then, the determination processing unit 1324 outputs a result of whether or not the determination is correct to the feedback unit 1325. That is, the determination processing unit 1324 determines whether or not the determination of the discriminator is correct on the basis of whether the input data to the discriminator is actual pseudo data. Then, the determination processing unit 1324 outputs a result of whether or not the determination of the discriminator is correct to the feedback unit 1325.

The feedback unit 1325 feeds back the result of whether or not the determination of the discriminator is correct to the discriminator and the generator. The feedback unit 1325 also feeds back the result output from the annotator request unit 1323 to the discriminator and the generator. Then, the discriminator adjusts parameters according to the feedback. In addition, the generator also adjusts parameters according to the feedback.

The second pseudo data output unit 1326 outputs pseudo data generated by the generator after adjustment of the parameters to the addition unit 133. For example, the second pseudo data output unit 1326 outputs, to the addition unit 133, pseudo data having a probability output by the discriminator after adjustment of the parameters and less than a predetermined threshold value among pseudo data generated by the generator after adjustment of the parameters.

According to this classification device 10b, it is possible to reflect the determination result of the annotator unit 131 at the time of learning of the generator and the discriminator. As a result, the generator can generate pseudo data less likely to be an existing benign URL/domain. Therefore, the classification device 10b can use pseudo data less likely to be an existing benign URL/domain to expand malicious learning data of a classifier. As a result, the classification device 10b can generate a classifier with high classification performance.

System Configuration and the Like

Each component of each of the illustrated units is a functional component and does not necessarily need to be physically configured as illustrated. In other words, the specific forms of distribution and integration of the devices are not limited as shown in the drawings and all or some of the devices may be distributed and integrated functionally or physically in any unit depending on various loads or utilization, etc. Additionally, all or any part of the processing functions performed in the respective devices may be achieved by a CPU and a program that is performed by the CPU or achieved as hardware by a wired logic.

Also, out of the processes described in the aforementioned embodiment, all or part of processes described as being automatically performed can be manually performed. Alternatively, all or part of processes described as being manually performed can be automatically performed by known methods. In addition, information including the processing procedure, control procedure, specific name, various data and parameters that are shown in the above documents and drawings may be arbitrarily changed unless otherwise described.

Program

The aforementioned classification devices 10, 10a, and 10b can be implemented by installing a program as package software or online software in a desired computer. For example, it is possible to cause an information processing device to serve as the classification device 10 of each embodiment by causing the information processing device to execute the above-described program, An information processing device as used here includes desktop and laptop personal computers. In addition, information processing devices include mobile communication terminals such as smartphones, mobile phones, and personal handyphone systems (PHSs), and terminals such as personal digital assistants (PDAs).

Further, the classification devices 10, 10a, and 10b can have a terminal device used by a user as a client and can be implemented as a server device that provides a service related to the above-described processing to the client. In this case, the server device may be implemented as a Web server, or may be implemented as a cloud that provides services regarding the above processing through outsourcing.

Figure 10:
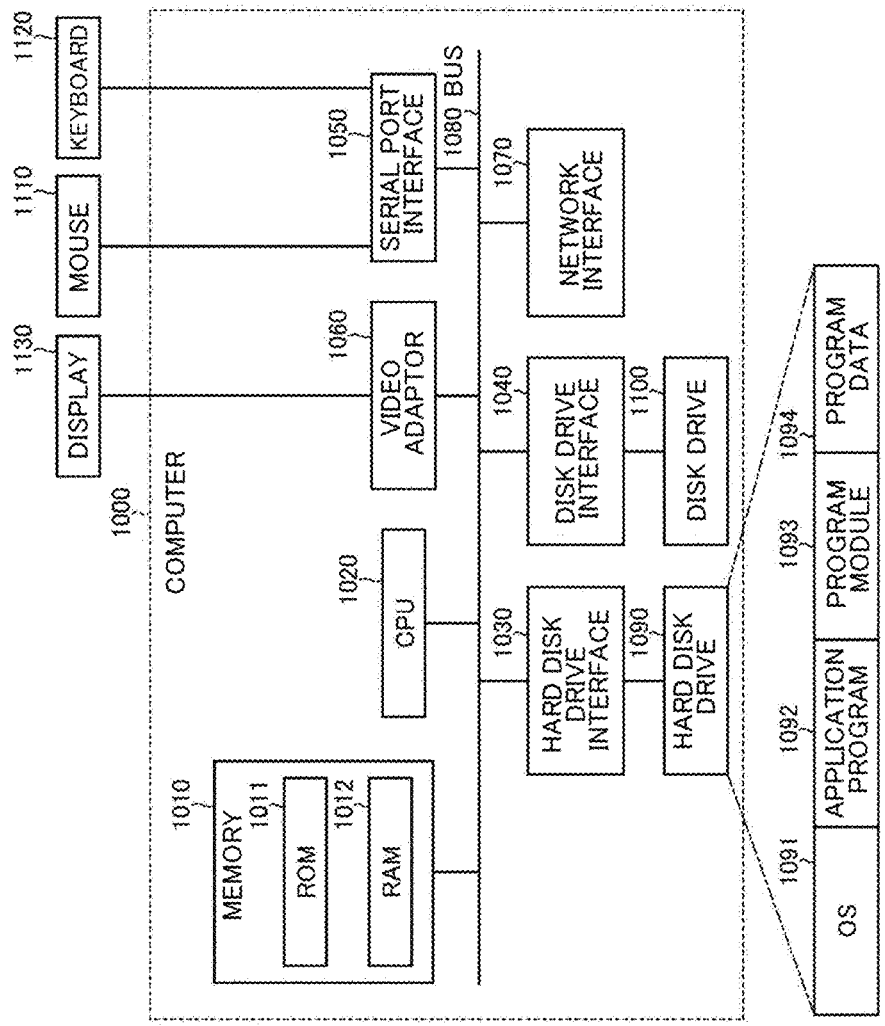
FIG. 10 is a diagram showing an example of a configuration of a computer that executes a classification program.

FIG. 10 is a diagram illustrating an example of a computer that executes a classification program. A computer 1000 includes, e.g., a memory 1010 and a CPU 1020. The computer 1000 also includes a hard disk drive interface 1030, a disc drive interface 1040, a serial port interface 1050, a video adapter 1060, and a network interface 1070. Each of these units is connected by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disc drive interface 1040 is connected to a disc drive 1100. For example, a removable storage medium such as a magnetic disk or an optical disc is inserted into the disc drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and a program data 1094. That is, a program that defines each type of processing executed by the above-described classification device 10 is implemented as the program module 1093 in which computer-executable code is described. The program module 1093 is stored in, e.g., the hard disk drive 1090. For example, the program module 1093 for executing processing corresponding to the functional configuration of the classification device 10 is stored in the hard disk drive 1090. Note that the hard disk drive 1090 may also be replaced by an SSD.

In addition, each piece of data used in processing in the above-described embodiments is stored in, for example, the memory 1010 or hard disk drive 1090 as the program data 1094. Then, the CPU 1020 reads the program module 1093 or program data 1094 stored in the memory 1010 or hard disk drive 1090 into the RAM 1012 and performs it as necessary.

The program module 1093 and the program data 1094 are not limited to a case in which the program module 1093 and the program data 1094 are stored in the hard disk drive 1090 and, for example, may be stored in a removable storage medium and may be read by the CPU 1020 via the disc drive 1100 or the like. Alternatively, the program module 1093 and the program data 1094 may be stored in another computer connected via a network (local area network (LAN), wide area network (WAN), or the like). Then, the program module 1093 and program data 1094 may be read out from the other computers via the network interface 1070 by the CPU 1020.

REFERENCE SIGNS LIST

10*a*, 10*b* Classification device
11 Input/output unit
12 Storage unit
13 Control unit
131 Annotator unit
132, 132*a*, 132*b* Data generation unit
133 Addition unit
134 Learning unit
135 Classification unit
1321 Active learning execution unit
1322 First pseudo data output unit
1323 Annotator request unit
1324 Determination processing unit
1325 Feedback unit
1326 Second pseudo data output unit

The invention claimed is:

1. A classification device comprising:
   processing circuitry configured to:
   generate, by a generator, pseudo data of benign uniform resource locators (URLs) or domains,
   determine whether the generated pseudo data of the benign URLs or domains includes an existing benign URL or domain, including:
      calculating, by a discriminator operating in a generative adversarial network (GAN) including the generator, a probability that a URL or domain of the generated pseudo data is the existing benign URL or domain,
      when the probability is between a first value and a second value, determining whether the URL or domain of the generated pseudo data is the existing benign URL or domain based upon data external to the classification device,
      when the probability is not between the first value and the second value, determining whether the URL or domain of the generated pseudo data is the existing benign URL or domain based upon the probability,
      feeding back a result of the determination as to whether the URL or domain of the generated pseudo data is the existing benign URL or domain to the generator and the discriminator, and
      when the probability is less than a predetermined threshold value, determining that the URL or domain of the generated pseudo data is not the existing benign URL or domain;
   add the generated pseudo data of the benign URLs or domains determined not to include the existing benign URL or domain to learning data of a malicious URL or domain; and
   learn a classifier for classifying an input URL or domain as being malicious or benign using the learning data of the malicious URL or domain to which the generated pseudo data has been added.

2. The classification device according to claim 1, wherein the processing circuitry is further configured to classify the input URL or domain as being malicious or benign using the classifier.

3. The classification device according to claim 1, wherein the processing circuitry is further configured to determine whether the URL or domain of the generated pseudo data is the existing benign URL or domain based upon data external to the classification device by performing processing for searching for a domain name referring to a management service of a predetermined domain name or processing for searching for an URL using a search engine.

4. The classification device according to claim 1, wherein to determine whether the generated pseudo data of the benign URLs or domains includes the existing benign URL or domain the processing circuitry is further configured to:
   learn a model for determining whether the generated pseudo data of the benign URLs or domains includes the existing benign URL or domain or pseudo data through active learning using a result of determination; and
   add the generated pseudo data of the benign URLs or domains determined not to include the existing benign URL or domain by the model.

5. The classification device according to claim 4, wherein the processing circuitry is further configured to learn the model through active learning using:
   information in which information on an URL or domain determined to be an existing benign URL or domain has been added to information on a benign URL or domain, and
   information in which information on an URL or domain determined not to be an existing benign URL or domain has been added to the generated pseudo data.

6. A classification method executed by a classification device, the classification method comprising:
   generating, by a generator, pseudo data of benign uniform resource locators (URLs) or domains,
   determining whether the generated pseudo data of the benign URLs or domains includes an existing benign URL or domain, including:
      calculating, by a discriminator operating in a generative adversarial network (GAN) including the generator, a probability that a URL or domain of the generated pseudo data is the existing benign URL or domain,
      when the probability is between a first value and a second value, determining whether the URL or domain of the generated pseudo data is the existing benign URL or domain based upon data external to the classification device,
      when the probability is not between the first value and the second value, determining whether the URL or domain of the generated pseudo data is the existing benign URL or domain based upon the probability, feeding back a result of the determination as to whether the URL or domain of the generated pseudo data is the existing benign URL or domain to the generator and the discriminator, and when the probability is less than a predetermined threshold value, determining that the URL or domain of the generated pseudo data is not the existing benign URL or domain;

adding the generated pseudo data of the benign URLs or domains determined not to include the existing benign URL or domain to learning data of a malicious URL or domain; and learning a classifier for classifying an input URL or domain as being malicious or benign using the learning data of the malicious URL or domain to which the generated pseudo data has been added.

7. A non-transitory computer-readable recording medium storing therein a classification program that causes a computer to execute a process comprising:

generating, by a generator, pseudo data of benign uniform resource locators (URLs) or domains, determining whether the generated pseudo data of the benign URLs or domains includes an existing benign URL or domain, including:

calculating, by a discriminator operating in a generative adversarial network (GAN) including the generator, a probability that a URL or domain of the generated pseudo data is the existing benign URL or domain, when the probability is between a first value and a second value, determining whether the URL or domain of the generated pseudo data is the existing benign URL or domain based upon data external to the classification device, when the probability is not between the first value and the second value, determining whether the URL or domain of the generated pseudo data is the existing benign URL or domain based upon the probability, feeding back a result of the determination as to whether the URL or domain of the generated pseudo data is the existing benign URL or domain to the generator and the discriminator, and when the probability is less than a predetermined threshold value, determining that the URL or domain of the generated pseudo data is not the existing benign URL or domain;

adding the generated pseudo data of the benign URLs or domains determined not to include the existing benign URL or domain to learning data of a malicious URL or domain; and learning a classifier for classifying an input URL or domain as being malicious or benign using the learning data of the malicious URL or domain to which the generated pseudo data has been added.

* * * * *